(12) United States Patent
Herke et al.

(10) Patent No.: US 6,882,121 B2
(45) Date of Patent: Apr. 19, 2005

(54) CONTROL DEVICE

(75) Inventors: Dirk Herke, Nuertingen (DE); Thomas Kanamueller, Esslingen (DE)

(73) Assignee: Alcoa Fujikura Gesellschaft mit beschraenkter Haftung, Frickenhausen (DE)

( * ) Notice: Subject to any disclaimer, the term of this patent is extended or adjusted under 35 U.S.C. 154(b) by 0 days.

(21) Appl. No.: 10/852,856

(22) Filed: May 25, 2004

(65) Prior Publication Data

US 2005/0057199 A1 Mar. 17, 2005

Related U.S. Application Data

(63) Continuation of application No. PCT/EP02/13111, filed on Nov. 22, 2002.

(30) Foreign Application Priority Data

Nov. 27, 2001 (DE) .......................................... 101 58 846

(51) Int. Cl.$^7$ ............................................... H02P 7/80
(52) U.S. Cl. .............................. 318/66; 318/34; 318/49; 318/599; 388/811; 361/18
(58) Field of Search .......................... 318/34–112, 139, 318/245, 254, 599, 603; 361/18–32; 388/805, 806, 811

(56) References Cited

U.S. PATENT DOCUMENTS

| | | | |
|---|---|---|---|
| 3,818,297 A | | 6/1974 | Ha et al. |
| 4,673,851 A | * | 6/1987 | Disser ......................... 388/831 |
| 4,866,356 A | | 9/1989 | Altendorf |
| 5,689,394 A | * | 11/1997 | Esser et al. ..................... 361/56 |
| 5,708,343 A | * | 1/1998 | Hara et al. .................... 318/599 |
| 5,811,948 A | * | 9/1998 | Sato et al. .................... 318/434 |
| 5,892,643 A | * | 4/1999 | Esser et al. ..................... 361/18 |
| 5,977,743 A | | 11/1999 | Flock |
| 6,091,887 A | * | 7/2000 | Dieterle et al. ............. 388/811 |
| 6,236,175 B1 | | 5/2001 | Mourad et al. |
| 6,621,309 B1 | * | 9/2003 | Roder et al. ................. 327/110 |
| 6,653,810 B1 | * | 11/2003 | Lo ............................... 318/569 |
| 6,759,820 B1 | * | 7/2004 | Karwath ...................... 318/254 |
| 6,774,587 B1 | * | 8/2004 | Makaran et al. .............. 318/34 |
| 2003/0117093 A1 | * | 6/2003 | Makaran et al. .............. 318/34 |
| 2003/0210011 A1 | * | 11/2003 | Dragoi et al. ................ 318/727 |
| 2004/0027105 A1 | * | 2/2004 | Nakamura et al. ........... 323/267 |

FOREIGN PATENT DOCUMENTS

| | | |
|---|---|---|
| DE | 1463614 | 2/1970 |
| DE | 44 29 998 | 2/1996 |
| DE | 197 02 949 | 7/1998 |
| DE | 199 49 896 | 1/2001 |
| JP | 10 014285 | 1/1998 |
| JP | 11 235078 | 8/1999 |

* cited by examiner

Primary Examiner—Paul Ip
(74) Attorney, Agent, or Firm—Barry R. Lipsitz; Douglas M. McAllister

(57) ABSTRACT

In order to improve a control device for operating a load circuit having at least one electric motor, this control device comprising a control stage which generates a pulse width modulated control signal, a power stage supplying the load circuit and having an electronic switch activated by the pulse width modulated control signal, a freewheeling element connected in parallel to the load circuit and a blocking monitoring means which generates a measurement switch-off interval by suppressing at least one switch-on interval of the pulse width modulated control signal, monitors the voltage in the load circuit during the measurement switch-off interval, compares it to a limit value and generates a blocking state signal in accordance with the comparison, in such a manner that a differentiated analysis of the voltages occurring in the measurement switch-off interval is possible it is suggested that for monitoring at least two electric motors connected in parallel in the load circuit the blocking monitoring means carry out a test run with at least one measurement cycle, in which a voltage sampling is carried out at different defined points in time after the start of at least one measurement switch-off interval and that the voltages determined in the load circuit during the voltage samplings be compared with at least one limit value.

20 Claims, 6 Drawing Sheets

CONTROL DEVICE

The present application is a continuation of disclosure relates to the subject matter disclosed in International application No. PCT/EP02/13111 of Nov. 22, 2002, which is incorporated herein by reference in its entirety and for all purposes.

BACKGROUND OF THE INVENTION

The invention relates to a control device for operating a load circuit having at least one electric motor, the control device comprising a control stage which generates a pulse width modulated control signal, a power stage supplying the load circuit and having an electronic switch activated by the pulse width modulated control signal, a freewheeling element connected in parallel to the load circuit and a blocking monitoring means which generates a measurement switch-off interval by suppressing at least one switch-on interval of the pulse width modulated control signal, monitors the voltage in the load circuit within the measurement switch-off interval, compares this to a limit value and generates a blocking state signal in accordance with the comparison.

It is only possible with this solution known from the state of the art to detect or not detect whether a voltage has occurred in the load circuit during the measurement switch-off interval on account of the overall voltage monitoring in the load circuit.

If, however, the load circuit comprises not only one electric motor but rather two electric motors, a voltage which is generated by the electric motor which is not blocked still occurs in the load circuit even when one of the two electric motors is blocked. The object underlying the invention is therefore to improve a control device of the type described at the outset in such a manner that a differentiated analysis of the voltages occurring in the measurement switch-off interval is possible.

SUMMARY OF THE INVENTION

This object is accomplished in accordance with the invention, in a control device of the type described at the outset, in that for the purpose of monitoring at least two electric motors connected in parallel in the load circuit the blocking monitoring means carries out a test run with at least one measurement cycle, in which a voltage sampling is carried out at different defined points in time after the start of at least one measurement switch-off interval and that the voltages determined in the load circuit during the voltage samplings are compared with at least one limit value.

The advantage of the inventive solution is to be seen in the fact that the samplings of the voltage in the load circuit which are carried out at different points in time after the start of the switch-off interval create the possibility of registering the occurrence and the values of the voltages and, therefore, of differentiating between different states in the load circuit, in particular, different blocking states.

As a result, it is possible to differentiate whether one of the electric motors is blocked or both and, in addition, it is possible to improve the detection reliability of the blocking monitoring means.

In principle, it would be conceivable to select the points in time within a measurement cycle, at which voltage samplings are carried out, optionally in the measurement switch-off interval. One particularly favorable solution provides, however, for the voltage samplings to be carried out in the load circuit at different points in time in the form of a series of voltage samplings, wherein the next respective voltage sampling in the series is carried out at a greater time interval from the start of the at least one measurement switch-off interval than the preceding voltage sampling in the series.

This solution makes it possible in a particularly advantageous manner to register the relevant time ranges within the measurement switch-off interval by way of voltage samplings.

Such a series of consecutive voltage samplings may be generated and evaluated particularly favorably when a time span of approximately the same length exists between the respectively consecutive voltage samplings.

In principle, it would be conceivable to distribute the voltage samplings of one measurement cycle between different measurement switch-off intervals. In order to require as few measurement switch-off intervals as possible for the test run, it is preferably provided for the voltage samplings of one measurement cycle to be carried out during one measurement switch-off interval.

In order, in addition, to have as great a reliability as possible when determining whether any blocking is present or not, it is preferably provided for the test run to comprise several measurement cycles.

In principle, it would be conceivable to combine the results of several measurement cycles and carry out a blocking check from the combined result. It is, however, particularly favorable when a complete blocking check is carried out during each measurement cycle in the measurement switch-off interval so that complete information as to the question of the different blocking possibilities is available after each measurement cycle.

In principle, it would be conceivable to issue the local state signal after carrying out each measurement cycle. It is, however, particularly favorable, in particular, in order to avoid unnecessary blocking reports when the test run is carried out with several measurement cycles prior to a blocking state signal being issued.

With respect to the evaluation of the blocking states determined in the several measurement cycles various possibilities would be conceivable. For example, it would be conceivable to form an average value.

However, in order to ensure that blocking is not erroneously reported, it is provided for no blocking to be reported when a blocking-free state of the load circuit is ascertained one time during one of the measurement cycles of the test run.

In order to carry out as few measurement cycles as possible, since these contribute to the build up of noise in the case of the electric motors, it is preferably provided for the test run to be stopped once a blocking-free state of the load circuit is ascertained.

When checking the blocking state it would, in principle, be sufficient to record either the freewheeling time during the measurement switch-off interval or the generator voltage forming after the freewheeling time.

Since, however, the measurements of the voltage in the load circuit are subject to considerable interferences, it is favorable, in particular, with respect to obtaining information concerning the blocking state which is as reliable as possible when not only the duration of the freewheeling time but also the amount of generator voltage following the freewheeling time are checked with the voltage samplings. This double determination of the states significant for the blocking state during the measurement switch-off interval considerably reduces the susceptibility to interference.

In principle, it is conceivable in this respect to determine the amount of the generator voltage by way of comparison with a limit value.

The reliability of the information is, however, increased in addition when the amount of the generator voltage is detected by means of different limit values with different voltage samplings during the test run.

With respect to the allocation of the limit values to the individual voltage samplings, the most varied of possibilities are conceivable.

For reasons of simplicity it is advantageous when the limit value is constant within a measurement cycle so that in the case of all the voltage samplings the measured voltage is compared to a limit value within one measurement cycle.

In order to have several comparisons, it is preferably provided for several measurement cycles to be carried out and for the limit value to be varied from measurement cycle to measurement cycle in order to be able to analyze the course of the voltage within a measurement switch-off interval with the most varied of limit values.

In this respect, it would be conceivable, in principle, to begin first of all with a high limit value and to use a lower limit value during the next measurement cycle.

With respect to the significance of the measurements it is, however, particularly advantageous when the limit value for the next measurement cycle is greater than the limit value for the preceding measurement cycle.

Alternatively to providing a limit value which is constant during a measurement cycle, a different advantageous solution provides for a comparison of the voltages with different limit values to be carried out within a measurement cycle.

For example, it would be conceivable in this respect to use two different limit values within one measurement cycle.

However, one solution has proven to be particularly expedient, with which a comparison with a different limit value is carried out for each voltage sampling within a measurement cycle.

One particularly favorable method provides, during the voltage samplings, for the next voltage sampling to be carried out at a higher limit value than the preceding voltage sampling.

In addition, no further details have been given in conjunction with the selection of the limit values.

It would, for example, be conceivable to permanently allocate the limit values, also different limit values, to the blocking monitoring means.

It is, however, particularly favorable when at least one of the limit values is determined as a function of a pulse duty ratio of the pulse width modulated control signal. This solution has proven to be advantageous for the reason that it is, as a result, possible to take into consideration for the limit values variations in the generator voltages forming differently on account of the pulse duty ratio.

It is even better when the at least one limit value is determined taking the supply voltage into consideration, wherein not only the supply voltage but also the pulse duty ratio of the pulse width modulated control signal are preferably taken into account.

The limit value is preferably determined on the part of the blocking monitoring means from a stored set of parameters, taking into consideration the pulse duty ratio of the pulse width modulated control signal and/or the supply voltage.

Additional features and advantages of the invention are the subject matter of the following description as well as the drawings illustrating several embodiments.

DETAILED DESCRIPTION OF THE INVENTION

Figure 1:
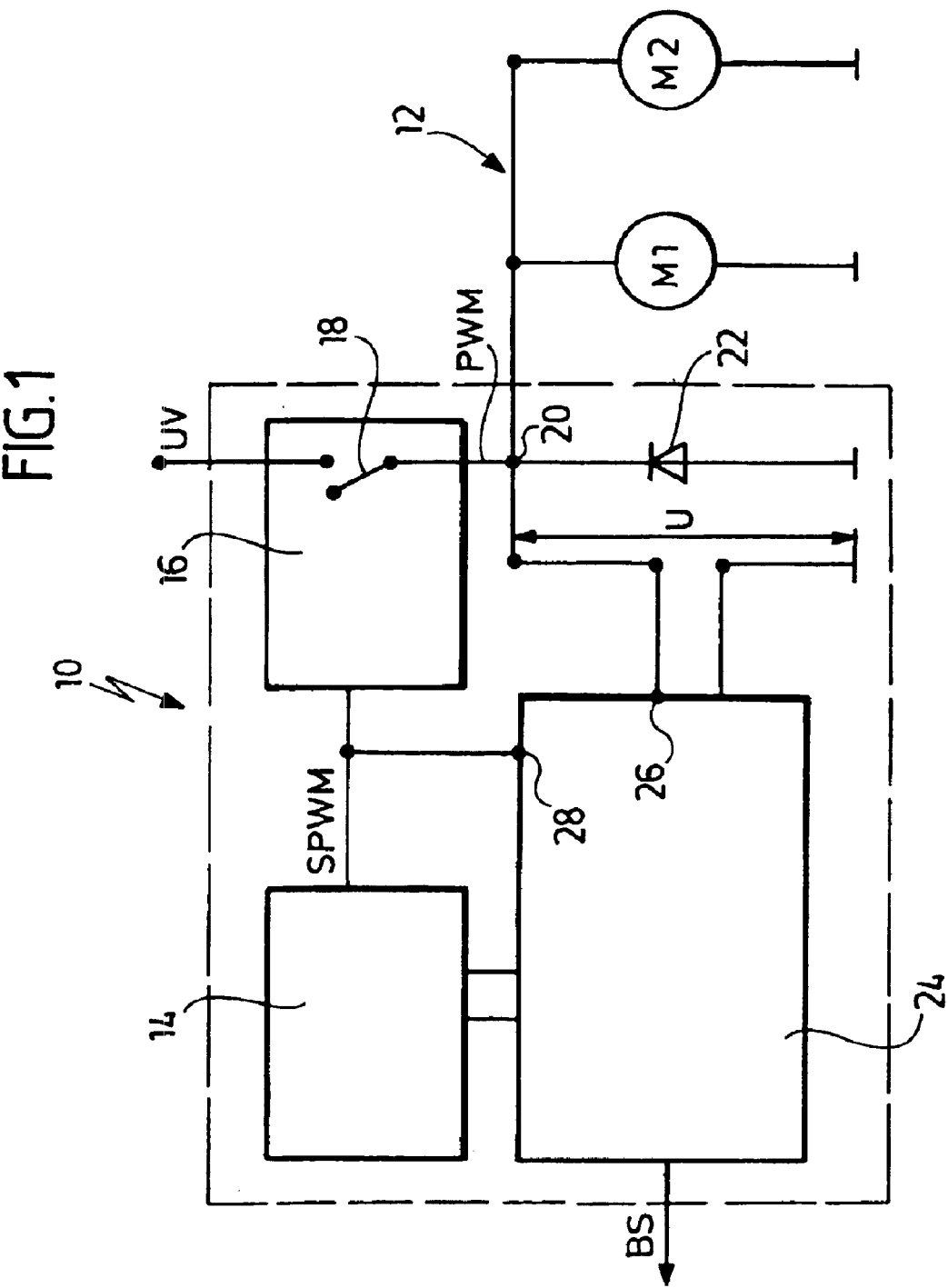
FIG. 1 shows a schematic illustration of the construction of an inventive control device.

One embodiment of an inventive control device, designated in FIG. 1 as a whole as 10, serves to operate two electric motors M1 and M2 which are provided in a load circuit 12 and connected in parallel in the load circuit 12.

For this purpose, the control device 10 comprises a control stage 14 which generates a pulse width modulated control signal SPWM, with which a power stage 16 can be activated which, for its part, has an electronic switch 18 which can be controlled by the pulse width modulated control signal SPWM and can, for example, be a field effect transistor. A pulse width modulated supply voltage PWM, which corresponds to the control signal with respect to its time behavior and with which the load circuit 12 can be supplied via a connecting terminal 20 thereof and, likewise, the two electric motors M1 and M2 which are connected in parallel, is generated with this electronic switch 18 controlled by the control signal SPWM.

In addition, a freewheeling diode, which is designated as a whole as 22 and takes over the freewheeling current generated by the inductors of the electric motors M1 and M2 when the pulse width modulated supply voltage PWM is switched off, is also located between the connecting terminal 20 and earth.

The freewheeling diode 22 can, however, also be an electronic switch activated in accordance with the pulse width modulated supply voltage PWM.

In addition, the inventive control device 10 comprises a blocking monitoring means 24, the input 26 of which is connected to the connecting terminal 20 and is therefore in a position to register a voltage U present in the load circuit 12.

Furthermore, the blocking monitoring means 24 likewise receives the pulse width modulated control signal SPWM at an input 28.

Figure 4:
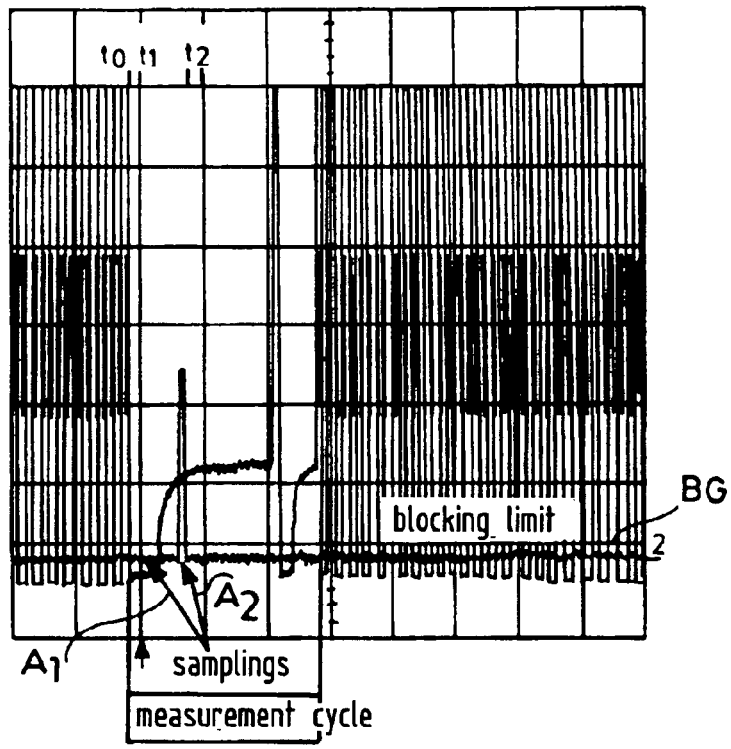
FIG. 4 shows an illustration of a first mode of operation of the inventive control device in the blocking-free state of the load circuit.

In the case of the inventive control device, the control stage 14 does not generate as pulse width modulated control signal SPWM a pure pulse width modulated signal RPWM, as illustrated in FIG. 4, but rather, by suppressing several switch-on intervals, a measurement switch-off interval MAI which is then followed, on the other hand, by a pure pulse width modulated signal RPWM.

The generation of the switch-on intervals by the control stage 14 is preferably initiated by the blocking monitoring means, wherein the blocking monitoring means starts a test run PL, which covers at least one measurement switch-off interval MAI or also several measurement switch-off intervals MAI, at regular time intervals.

Figure 2:
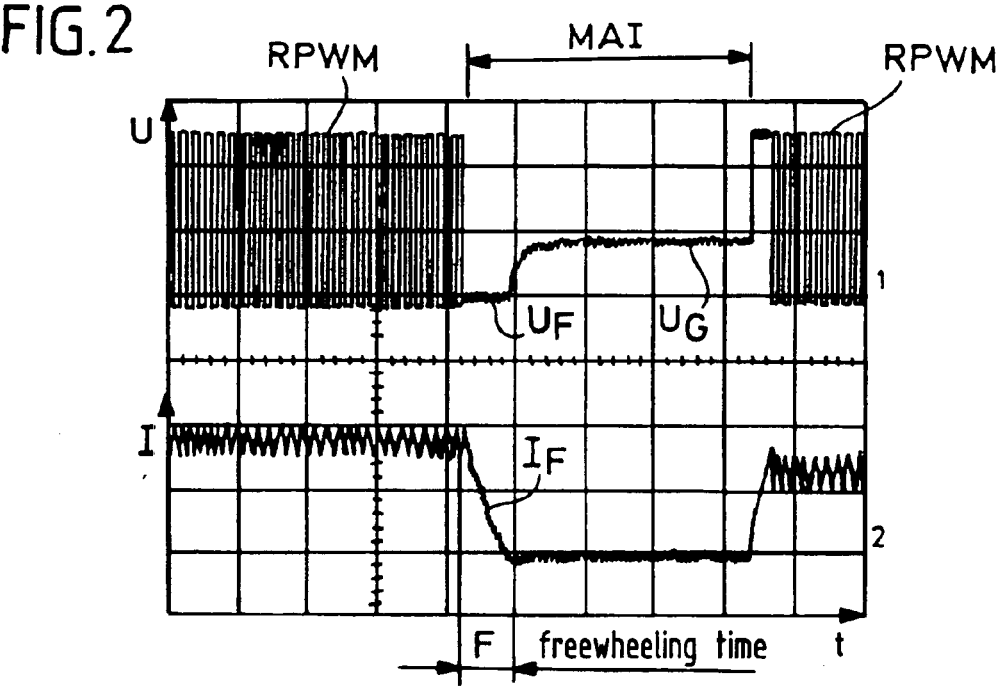
FIG. 2 shows an illustration of a voltage and a current in the load circuit over a common time axis during a blocking-free state of the electric motors M1 and M2.

The measurement switch-off intervals MAI extend, in this respect, over a time span which is greater than a freewheeling time F, during which a freewheeling current $I_F$ flows via the freewheeling diode 22, namely for such a time until the freewheeling current $I_F$ has been completely reduced (FIG. 2).

During this freewheeling time F, the voltage $U_F$ measured by the blocking monitoring means at the connecting terminal 20 is smaller than or equal to zero. Following the freewheeling time F, a generator voltage $U_G$ is again built up and this results due to the fact that the electric motors M1 and M2 continue to run on account of their inertia.

Figure 3:
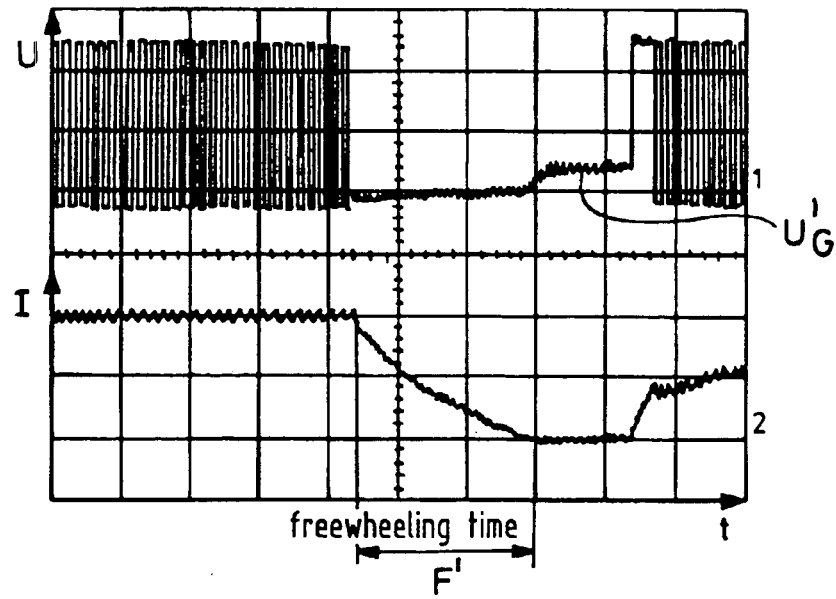
FIG. 3 shows an illustration of the voltage and the current in the load circuit similar to FIG. 2 during blocking of one of the two electric motors M1 and M2.

If, as illustrated in FIG. 3, one of the electric motors, for example, the electric motor M2 is now blocked, this results in an altered behavior of the freewheeling current $I_F$ and of the generator voltage ($U_G$) in the measurement switch-off interval MAI. On the one hand, the freewheeling time F' is considerably greater than in the normal state with two electric motors which are not blocked and, on the other hand, when only one electric motor, in this case the electric motor M1, is running, the generator voltage $U_G$' is considerably smaller than the generator voltage $U_G$ in the case of two electric motors M1 and M2 which are not blocked, as results from a comparison of FIG. 2 and FIG. 3.

If both electric motors M1 and M2 are blocked, no more generator voltage $U_G$ at all occurs in the measurement switch-off interval MAI and the freewheeling time F becomes even greater. This case is, however, easy to detect.

Detection of the case where one of the two electric motors M1 and M2 connected in parallel is blocked is problematic.

For this purpose, a respective voltage sampling A1, A2 is carried out during a first mode of operation of the inventive blocking monitoring means 24, proceeding from a beginning of the measurement switch-off interval MAI at the point of time to at ever greater time intervals $t_1$, $t_2$ from the point of time $t_0$ and the voltage determined during the respective voltage sampling A1, A2 is compared to a blocking limit value BG.

If, for example, the two electric motors M1 and M2 are running in normal operation, the fact that the blocking limit value BG is exceeded will not be ascertained during the first sampling A1 but after the second sampling A2, as illustrated in FIG. 4. In this case, the blocking state signal BS "not blocked" is issued.

As a result, a further sampling is not necessary since the blocking monitoring means 24 has clearly ascertained that neither of the electric motors M1 or M2 is blocked. In this case, further voltage samplings at later points in time are suppressed.

Figure 5:
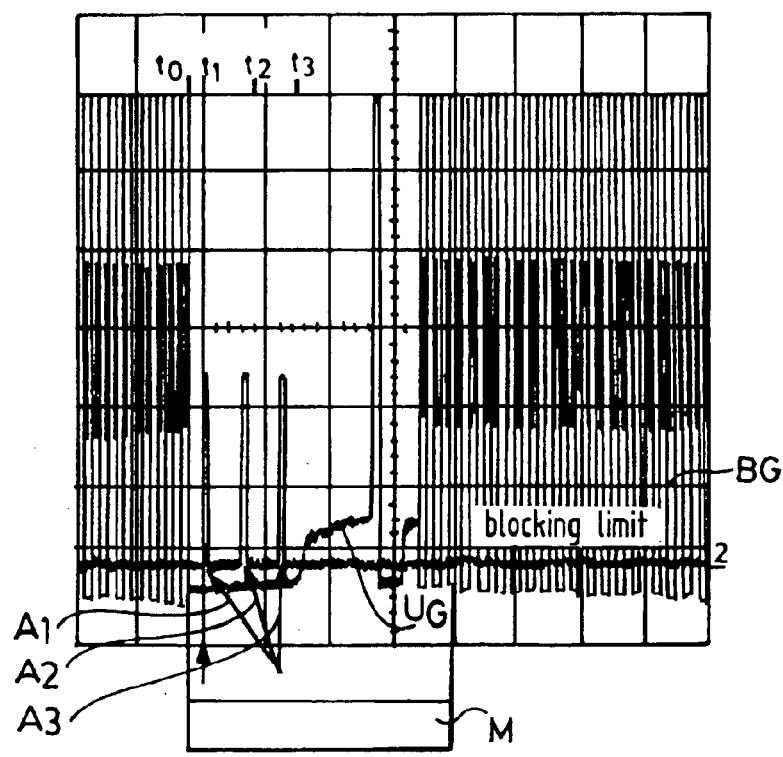
FIG. 5 shows an illustration of the first mode of operation of the inventive control device in the case of a blocked electric motor in the load circuit.

If, on the other hand, as illustrated in FIG. 5, one of the electric motors M1 M2 is blocked, the generator voltage $U_G$ sets in much later than in the case of electric motors M1, M2 which are not blocked.

If, as a result, the voltage is sampled at the connecting terminal 20 within the measurement cycle M at different, consecutive points of time $t_1$, $t_2$ and $t_3$, it will be ascertained that the blocking limit BG is not exceeded since even at the point of time $t_3$ the sampled voltage does not exceed the blocking limit.

The first mode of operation of the inventive control device uses within a measurement cycle M a series of, for example, three samplings A1 to A3 at points of time $t_1$, $t_2$ and $t_3$ which are carried out one after the other at an ever greater time interval from to.

In this respect, the last sampling, for example, the sampling A3 with the greatest time interval $t_3$ from to is carried out such that the voltage U detected during this sampling has not yet exceeded the blocking limit value BG when one of the electric motors M1 or M2 is blocked.

In this case, the blocking monitoring means is therefore in a position to differentiate between whether both electric motors M1 and M2 are running or one of the two electric motors M1 or M2 is blocked and to issue a corresponding blocking state signal BS. On the other hand, it is not possible to differentiate between whether both electric motors M1 and M2 are blocked or only one.

The first mode of operation of the inventive control device operates according to the principle of monitoring the duration of the freewheeling time F' since this becomes greater when one of the electric motors M1, M2 is blocked, as explained in conjunction with FIG. 3, and, therefore, the increase in the generator voltage $U_G$ is shifted to longer points in time following the start of the measurement switch-off interval MAI.

Since the sampling A3 is carried out following a gap in time after the sampling A2, the monitoring as to whether the blocking limit value BG has been exceeded or not during the sampling A3 therefore represents, in principle, a monitoring of the duration of the freewheeling time F' in order to ascertain whether one of the electric motors M1, M2 is blocked or not.

Figure 6:
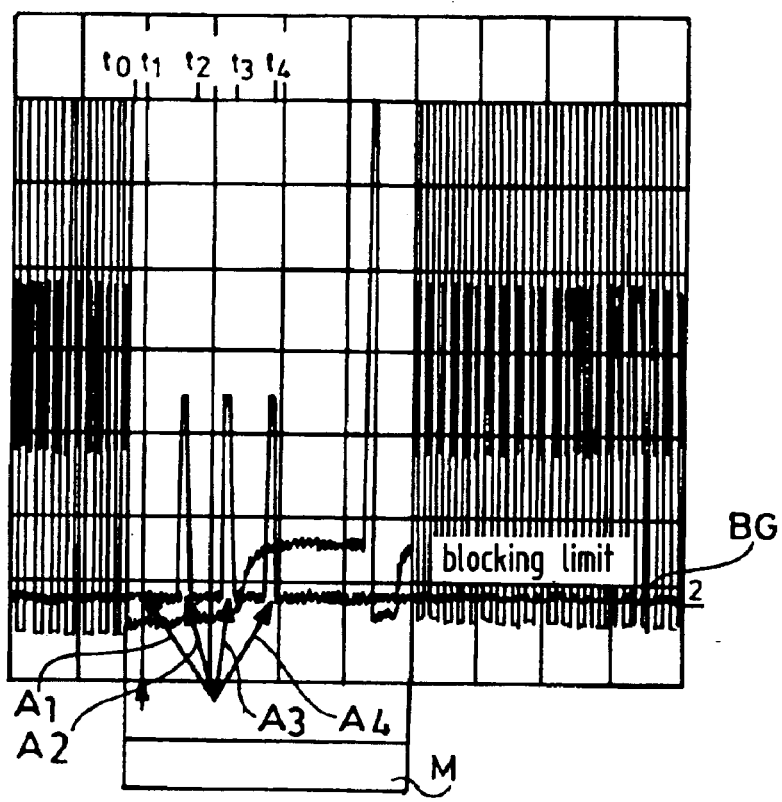
FIG. 6 shows an illustration of a second mode of operation of the inventive control device in the case of a blocked electric motor in the load circuit.

During a second mode of operation of the inventive solution, illustrated in FIG. 6, the number of voltage samplings is increased, for example, four samplings A1, A2, A3 and A4 are used, wherein the last sampling A4 is carried out with a time interval t4 from the beginning to of the measurement switch-off interval, at which the blocking limit value BG is also exceeded when one of the electric motors M1 or M2 is blocked.

Also in the case of the second mode of operation, the blocking monitoring means 24 must recognize that the blocking limit BG has not been exceeded at a time interval $t_3$ and, therefore, one of the electric motors M1 or M2 must be blocked. As a result, the blocking state signal BS "blocked" is issued. The sampling A4 at the time interval $t_4$ does, however, allow the blocking monitoring means 24 to ascertain whether both electric motors M1 and M2 are blocked or whether one of them is still operable.

Also in the case of the second mode of operation, the blocking monitoring means 24 operates according to the principle of monitoring the freewheeling time F' which is brought about in that the decisive criterion for the blocking of one of the two electric motors M1 or M2 is to be seen in the fact that during the second sampling A2 and during the third sampling A3 the blocking limit value BG was not exceeded.

This means that in this case the voltage samplings A1, A2, A3 carried out represent a detection of the duration of the freewheeling time F'.

Figure 7:
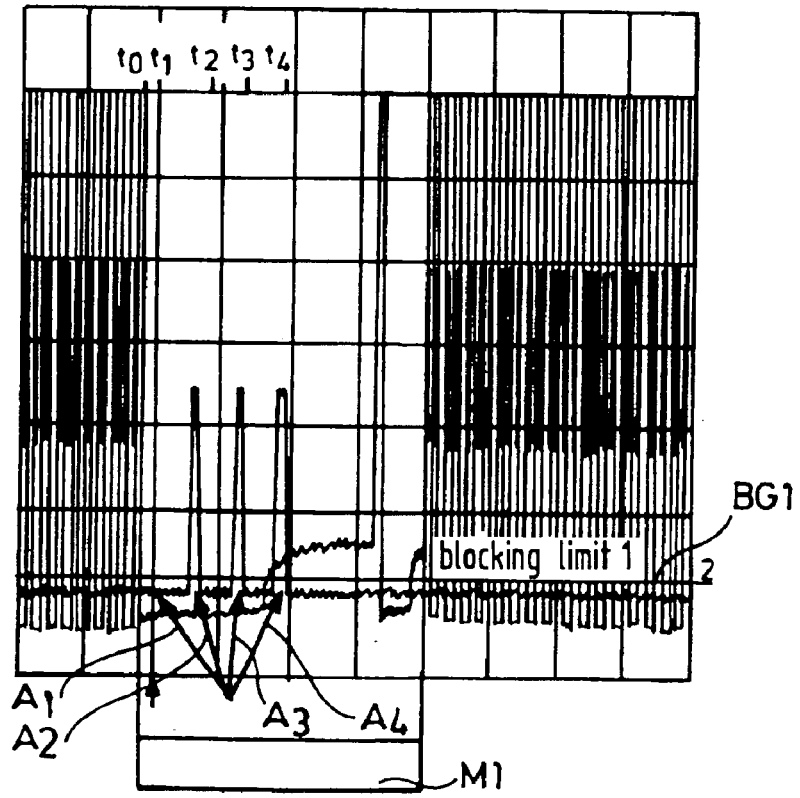
FIG. 7 shows an illustration of a first of several measurement cycles of a third mode of operation of the inventive control device in the case of a minimal blocking limit value.
Figure 8:
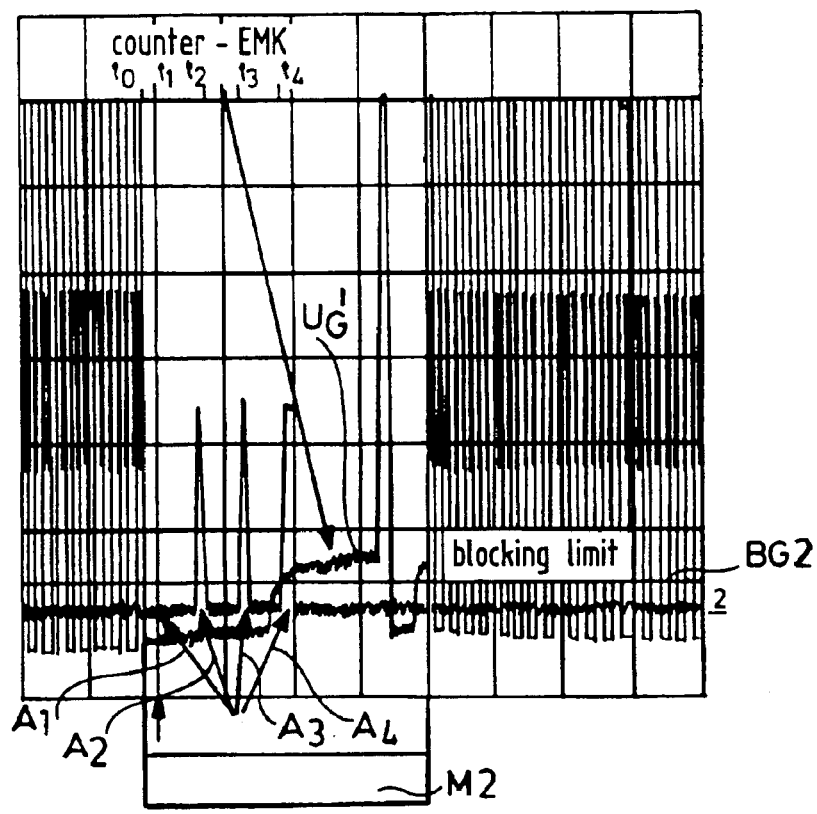
FIG. 8 shows an illustration similar to FIG. 7 of a second measurement cycle of the third mode of operation in the case of an increased blocking limit value.
Figure 9:
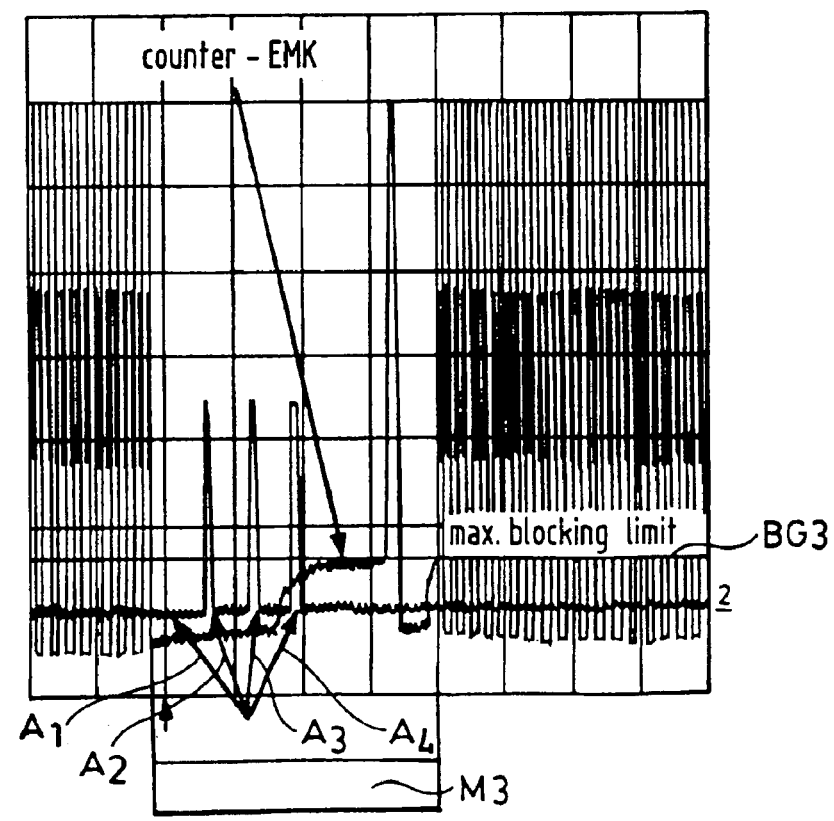
FIG. 9 shows an illustration similar to FIG. 7 of a third measurement cycle in the case of a third mode of operation with a maximum blocking limit value and FIG. 10 shows an illustration of a measurement cycle of a fourth mode of operation of an inventive control device with blocking limit values increasing from sampling to sampling.

A third mode of operation, illustrated in FIGS. 7 to 9, provides for a total of four samplings A1 to A4 to be used during a first measurement cycle M1 in the same way as in the case of the second mode of operation but several measurement cycles M1 to M3 are carried out one after the other within the scope of a test run PL.

During the first measurement cycle M1, a blocking limit value BG1 is used which is the lowest blocking limit value.

Since, however, it is ascertained during the first measurement cycle M1 that the blocking limit value BG1 has been exceeded only during the fourth sampling A4 but the blocking limit value BG1 was not exceeded during the second sampling A2 or the third sampling A3, the blocking monitoring means 24 recognizes that, in all probability, one of the electric motors M1 and M2 is blocked.

However, the blocking monitoring means 24 likewise recognizes at the same time that, in all probability, not both electric motors M1 and M2 are blocked.

The first measurement cycle M1 is followed by a second measurement cycle M2 and during this second measurement cycle M2 the blocking limit value is increased from the blocking limit value BG1 to the blocking limit value BG2 which is greater than the blocking limit value BG1 by a specific value.

During the second measurement cycle M2 the blocking monitoring means 24 recognizes that the blocking limit value BG2 has likewise not been exceeded either during the second sampling A2 or during the third sampling A3 and so strong indicators for blocking are still present.

For this reason, the test run PL is continued after the second measurement cycle M2.

Following the second measurement cycle M2, a third measurement cycle M3 takes place and during the third measurement cycle M3 the blocking limit value is increased to the maximum blocking limit value BG3 which is the highest possible blocking limit value.

As is apparent from FIG. 9, it is ascertained during the voltage sampling A4 that the blocking limit value BG3 is not exceeded and for this reason it is recognized that one of the electric motors M1, M2 is blocked and the corresponding blocking signal BS "blocked" is issued.

During the course of the third measurement cycle, the blocking monitoring means 24 not only recognizes again that the blocking limit value BG3 has not been exceeded either during the second sampling A2 or during the third sampling A3 and that the maximum blocking limit value BG3 has also not been exceeded by the voltage $U_G$ during the fourth sampling A4.

This means that although a voltage $U_G$ is present during the fourth sampling A4, this voltage is lower than the voltage predetermined by the maximum blocking limit value BG3 and so one of the electric motors M1 and M2 must clearly be blocked.

The third mode of operation therefore allows not only a determination of the increase in the freewheeling time F' but also an estimation of the amount of the generator voltage $U_G'$, namely due to the fact that this is, on the one hand, greater than the first blocking limit value BG1 and, on the other hand, is smaller than the maximum blocking limit value BG3.

As a result, it is possible to exclude interruptions in the generator voltage which would be caused by external interferences or short-term operational fluctuations or short-term operational blocking.

If, for example, the blocking monitoring means 24 were to ascertain during the third measurement cycle that the maximum blocking limit value BG3 has been exceeded by the generator voltage $U_G$, the blocking monitoring means 24 would issue the blocking state signal BS "not blocked" and trigger a new test run PL immediately following thereafter.

With this procedure it can be ensured that reports on any blocking of an electric motor M1, M2, which are caused by interferences or operational fluctuations of the electric motors M1, M2 and would, for example, trigger a switching off of the system which would not be justified on account of no blocking being present and, in particular, cannot be tolerated for the use of the inventive control device for operating fan motors in a motor vehicle which are connected in parallel, are avoided as far as possible.

Figure 10:
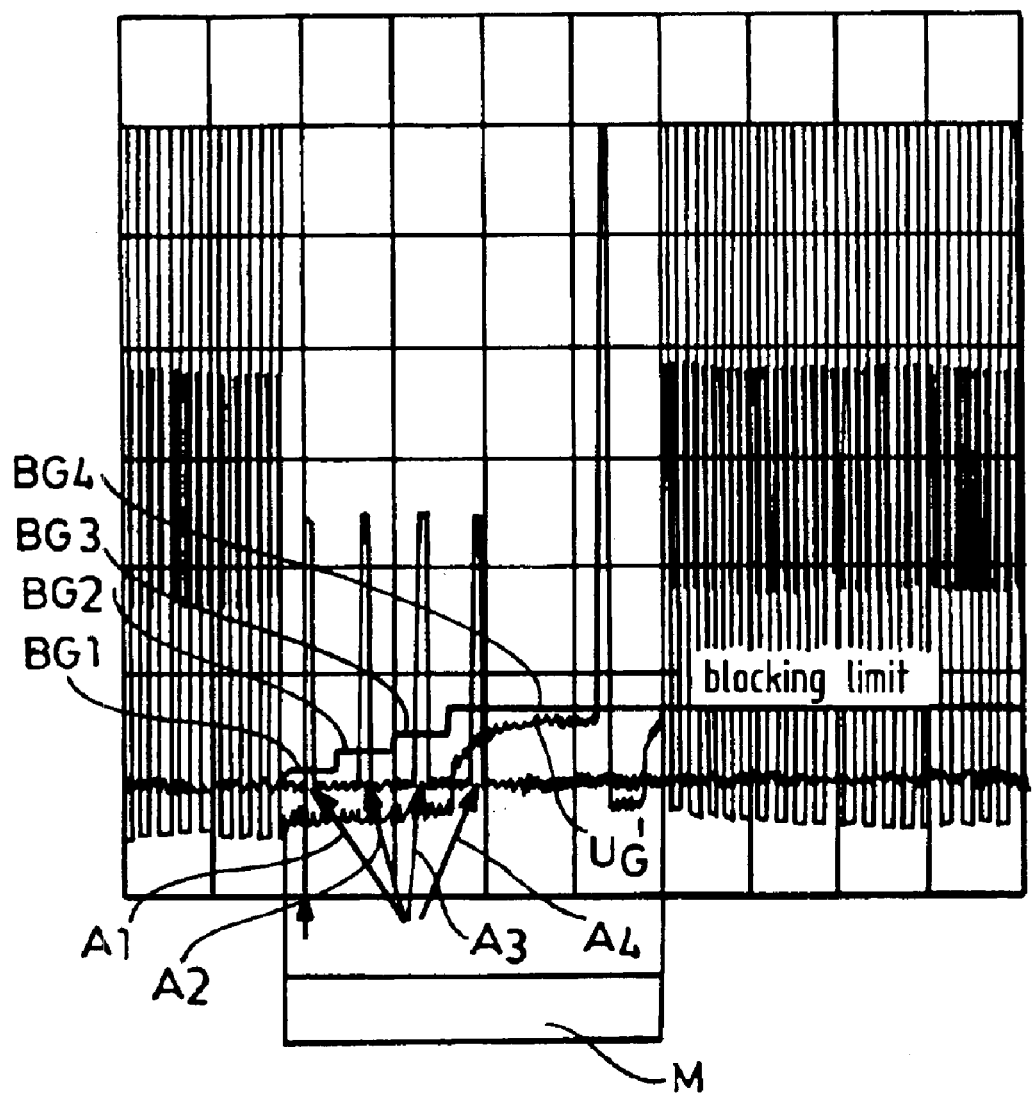

In a fourth mode of operation, illustrated in FIG. 10, four samplings A1 to A4 are likewise used, wherein the blocking limit value BG is increased in steps from voltage sampling A1 to A4 to voltage sampling A1 to A4.

This means that during the voltage sampling A1 a comparison with the blocking limit value BG1 takes place, during the voltage sampling A2 a comparison with the blocking limit value BG2, during the voltage sampling A3 a comparison with the blocking limit value BG3 and during the voltage sampling A4 a comparison with the blocking limit value BG4 so that all the information is available within one measurement cycle M.

As is apparent from FIG. 10, the generator voltage $U_G'$ is so low on account of one of the electric motors M1 and M2 being blocked that this is below the blocking limit value BG4 and, therefore, it is recognized by the blocking monitoring means 24 that one of the electric motors M1 or M2 is blocked and for example, following a test run PL with two or three measurement cycles M which supply the same result—the blocking state signal BS "blocked" is issued.

During the fourth mode of operation of the inventive solution, not only a detection of the increase in the freewheeling time F' takes place but at the same time a detection of the amount of the generator voltage $U_G'$, wherein during the fourth mode of operation a relatively low generator voltage $U_G'$ would be sufficient during the second sampling A2 to exceed the blocking limit value BG2 and so the blocking monitoring means would assume that the electric motors M1 and M2 are operating normally.

On the other hand, the blocking limit values BG3 and BG4 are increased successively in relation to the blocking limit value BG2 since the ascertainment of a non-blocked state during the sampling A3 is only justified when the generator voltage $U_G$ is actually of a sufficient amount and, for example, the blocking limit value BG2 has not been exceeded because at this point in time an interference has decreased the generator voltage $U_G$.

The blocking limit value BG4 is set at an even higher level and so this can likewise be exceeded only when the generator voltage $U_G$ would essentially reach the level of normal operation and, for example, during the voltage samplings A2 and A3 the blocking limit value BG2 or BG3 has not been exceeded only because, for example, —which occurs relatively seldom—an interference of the generator voltage $U_G$ due to an operational fluctuation of one of the electric motors M1, M2 or of both electric motors M1, M2 was present during the two voltage samplings A2 and A3.

In the case of the inventive solution, the first blocking limit value BG1 is preferably set as a fixed, predetermined limit value not only during the third but also during the fourth mode of operation whereas the blocking limit values BG2, BG3 and BG4 which are at a higher level are calculated, namely taking into consideration the pulse duty ratio of the pulse width modulation PWM prior to the measurement switch-off interval and taking into consideration a supply voltage UV since both parameters have an influence on the generator voltage $U_G$ which is formed.

For example, the pulse duty ratio of the pulse width modulated supply voltage PWM influences the rotational speed of the motors M1, M2 and the generator voltage $U_G$ which is formed is also dependent on this rotational speed of the motor in the measurement switch-off interval MAI.

In addition, the supply voltage UV also influences the rotational speed of the motors M1, M2 are so the generator voltage $U_G'$ is also dependent on the supply voltage UV in the measurement switch-off interval MAI for this reason.

Sets of data are preferably stored in a memory of the blocking monitoring means 24 with an allocation of blocking limit values BG to ranges of the pulse duty ratio of the pulse width modulated supply voltage PWM and ranges of the supply voltage UV and are then called up from this memory by the blocking monitoring means for determining the increased blocking limit values BG2 to BG4 and used for calculation.

What is claimed:

1. Control device for operating a load circuit having at least one electric motor, said control device comprising a control stage generating a pulse width modulated control signal, a power stage supplying the load circuit and having an electronic switch controlled by the pulse width modulated control signal, a freewheeling element connected in parallel to the load circuit and a blocking monitoring means generating a measurement switch-off interval by suppressing at least one switch-on interval of the pulse width modulated control signal, monitoring the voltage in the load circuit during the measurement switch-off interval, comparing it to a limit value and generating a blocking state signal in accordance with the comparison, the blocking monitoring means for monitoring at least two electric motors connected in parallel in the load circuit carrying out a test run with at least one measurement cycle, in said measurement cycle a voltage sampling being carried out at different defined points in time after the start of at least one measurement switch-off interval and the voltages determined in the load circuit during the voltage samplings being compared with at least one limit value.

2. Control device as defined in claim 1, wherein during a measurement cycle the voltage samplings are carried out in the load circuit at different points in time in the form of a series of voltage samplings, wherein the respectively following voltage samplings in the series are carried out at a greater time interval from the start of the at least one measurement switch-off interval than the preceding voltage sampling in the series.

3. Control device as defined in claim 2, wherein a time span of approximately the same length exists between respectively consecutive voltage samplings within the series.

4. Control device as defined in claim 1, wherein the voltage samplings of one measurement cycle are brought about during one measurement switch-off interval.

5. Control device as defined in claim 1, wherein the test run comprises several measurement cycles.

6. Control device as defined in claim 5, wherein a complete blocking check is carried out during each measurement cycle in the measurement switch-off interval.

7. Control device as defined in claim 1, wherein a test run is carried out with several measurement cycles prior to a blocking state signal being issued.

8. Control device as defined in claim 7, wherein no blocking is reported when a blocking-free state of the load circuit is ascertained one time during one of the measurement cycles of the test run.

9. Control device as defined in claim 7, wherein the test run is stopped once a blocking-free state of the load circuit is ascertained.

10. Control device as defined in claim 1, wherein not only the duration of the freewheeling time but also the amount of generator voltage following the freewheeling time are checked with the voltage samplings.

11. Control device as defined in claim 10, wherein the amount of the generator voltage is detected by means of different limit values with different voltage samplings during the test run.

12. Control device as defined in claim 1, wherein the limit value is constant within a measurement cycle.

13. Control device as defined in claim 12, wherein several measurement cycles are carried out and wherein the limit value is varied from measurement cycle to measurement cycle.

14. Control device as defined in claim 13, wherein the limit value is increased during the next measurement cycle in relation to the limit value of the preceding measurement cycle.

15. Control device as defined in claim 1, wherein a comparison of the voltages with different limit values is carried out within a measurement cycle.

16. Control device as defined in claim 15, wherein a comparison with a different limit value is carried out for each voltage sampling within a measurement cycle.

17. Control device as defined in claim 16, wherein during the voltage samplings the next voltage sampling is carried out at a higher limit value than the preceding voltage sampling.

18. Control device as defined in claim 1, wherein at least one of the limit values is determined as a function of a pulse duty ratio of the pulse width modulated control signal.

19. Control device as defined in claim 1, wherein the at least one limit value is determined taking the supply voltage into consideration.

20. Control device as defined in claim 18, wherein the at least one limit value is determined from a stored set of parameters.

* * * * *